(12) United States Patent
Shiono et al.

(10) Patent No.: US 9,023,927 B2
(45) Date of Patent: May 5, 2015

(54) ADHESIVE COMPOSITION

(71) Applicant: Shin-Etsu Chemical Co., Ltd., Tokyo (JP)

(72) Inventors: Mikio Shiono, Annaka (JP); Kenichi Fukuda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/041,611

(22) Filed: Sep. 30, 2013

(65) Prior Publication Data

US 2014/0107263 A1     Apr. 17, 2014

(30) Foreign Application Priority Data

Oct. 11, 2012 (JP) ................. 2012-225707

(51) Int. Cl.
| | |
|---|---|
| *C08K 5/541* | (2006.01) |
| *C09J 11/06* | (2006.01) |
| *C09J 183/06* | (2006.01) |
| *C09J 183/08* | (2006.01) |
| *C09J 183/12* | (2006.01) |
| C08G 77/12 | (2006.01) |
| C08G 77/14 | (2006.01) |
| C08G 77/18 | (2006.01) |
| C08K 9/06 | (2006.01) |

(52) U.S. Cl.
CPC ........... *C09J 11/06* (2013.01); *C08G 77/12* (2013.01); *C08G 77/14* (2013.01); *C08G 77/18* (2013.01); *C09J 183/06* (2013.01); *C09J 183/08* (2013.01); *C09J 183/12* (2013.01); C08K 9/06 (2013.01)

(58) Field of Classification Search
USPC .......................... 524/261, 586, 588
See application file for complete search history.

(56) References Cited

U.S. PATENT DOCUMENTS

| | | | | |
|---|---|---|---|---|
| 5,656,711 A | * | 8/1997 | Fukuda et al. | 528/15 |
| 5,919,886 A | * | 7/1999 | Matsuda et al. | 528/42 |
| 6,417,311 B1 | | 7/2002 | Fukuda et al. | |
| 2004/0266925 A1 | * | 12/2004 | Shiono | 524/262 |
| 2007/0100043 A1 | * | 5/2007 | Shiono | 524/261 |
| 2011/0251339 A1 | * | 10/2011 | Yamaguchi et al. | 524/588 |

FOREIGN PATENT DOCUMENTS

| | | |
|---|---|---|
| EP | 0765916 B1 | 11/2000 |
| EP | 1 223 194 A1 | 7/2002 |
| EP | 1081185 B1 | 5/2004 |
| EP | 1486534 A1 | 12/2004 |
| EP | 2005-002142 A | 1/2005 |
| EP | 2007-126496 A | 5/2007 |
| EP | 1780253 A2 | 5/2007 |
| EP | 2 345 709 A2 | 7/2011 |
| EP | 2345709 A2 * | 7/2011 |
| JP | 3239717 B2 | 12/2001 |
| JP | 3567973 B2 | 9/2004 |

OTHER PUBLICATIONS

Extended European Search Report issued Dec. 4, 2013, in European Patent Application No. 13187723.5.

* cited by examiner

*Primary Examiner* — Peter D Mulcahy
*Assistant Examiner* — Henry Hu
(74) *Attorney, Agent, or Firm* — Birch, Stewart, Kolasch & Birch, LLP

(57) ABSTRACT

An adhesive composition is provided comprising (A) a linear polyfluoro compound having at least two alkenyl groups and a perfluoropolyether structure in its main chain, (B) a fluorinated organohydrogensiloxane having at least two SiH groups, (C) a hydrosilylation catalyst, (D) hydrophobic silica powder, (E) a fluorinated acetylene alcohol, and (F) an organosiloxane containing a SiH group and an epoxy and/or trialkoxysilyl group. A cured product of the composition has a smooth and uniform surface.

4 Claims, No Drawings

ADHESIVE COMPOSITION

CROSS-REFERENCE TO RELATED APPLICATION

This non-provisional application claims priority under 35 U.S.C. §119(a) on Patent Application No. 2012-225707 filed in Japan on Oct. 11, 2012, the entire contents of which are hereby incorporated by reference.

TECHNICAL FIELD

This invention relates to an adhesive composition which cures into a fluoridated elastomer to form a tenacious bond to various substrates including metals and plastics, and more particularly, to an adhesive composition which cures into a product having a smooth and uniform surface and is suited for use in coating and potting applications.

BACKGROUND ART

Curable fluorinated elastomer compositions utilizing addition reaction between alkenyl and hydrosilyl groups are well known in the art. These compositions can be rendered self-adhesive by adding an organopolysiloxane having a hydrosilyl group and an epoxy and/or trialkoxysilyl group as the third component, as disclosed in JP 3239717 and JP 3567973. These compositions may cure on brief heating into elastomers having advantages including solvent resistance, chemical resistance, heat resistance, low-temperature properties, low moisture permeability, and electric properties. They are used in the adhesive application in various industrial fields where such properties are required, and frequently for the bonding and sealing of electrical components in the automotive industry.

These compositions are useful as a durable bonding/sealing agent capable of utilizing stress relaxation of elastomer, when applied between materials of like or different type. However, problems arise when these compositions are applied for coating of electric/electronic component-loaded boards and for potting of electric/electronic component-receiving packages. As the coating weight or casting amount increases, the surface of cured products tends to deviate from smoothness and become non-uniform or irregular. Then dust, soot, water, corrosive substances or the like accumulates in surface dimples. Such deposits become starting sites for decomposition reaction, resulting in local variations of protection performance. To solve the problems of the above compositions (JP 3239717 and JP 3567973), JP-A 2005-002142 and JP-A 2007-126496 propose to add thereto an isocyanurate compound having at least one epoxy and/or trialkoxysilyl group bonded to a nitrogen atom via a carbon atom in a molecule. The resulting compositions are fully adherent to a variety of substrates including metals and plastics and form protective members (cured products) having a smooth and uniform surface independent of their thickness. They still have the drawbacks that the cure rate largely varies depending on the amount of the isocyanurate compound added, and curability lowers with time during shelf storage.

CITATION LIST

Patent Document 1: JP 3239717 (U.S. Pat. No. 5,656,711, EP 0765916)
Patent Document 2: JP 3567973 (U.S. Pat. No. 6,417,311, EP 1081185)
Patent Document 3: JP-A 2005-002142 (US 20040266925, EP 1486534)
Patent Document 4: JP-A 2007-126496 (US 20070100043, EP 1780253)

DISCLOSURE OF INVENTION

An object of the invention is to provide an adhesive composition having curability and shelf stability, which is cured by brief heating into a product having a smooth and uniform surface that establishes a tenacious bond to a wide variety of substrates including metals and plastics, the cured product having many advantages including solvent resistance, chemical resistance, heat resistance, low-temperature properties, low moisture permeability, and electric properties.

The inventors have found that an addition curable composition comprising (A) a linear polyfluoro compound having at least two alkenyl groups per molecule and a perfluoropolyether structure in its main chain, (B) a fluorinated organohydrogensiloxane having at least two SiH groups per molecule, and (C) a platinum group metal-based hydrosilylation catalyst is improved by adding thereto (D) hydrophobic silica powder, (E) a fluorinated acetylene alcohol, and (F) an organosiloxan containing at least one silicon-bonded hydrogen atom and at least one epoxy and/or trialkoxysilyl group bonded to a silicon atom via a carbon atom or via carbon and oxygen atoms per molecule. The above and other objects are achievable by the resulting composition.

Accordingly, the invention provides an adhesive composition comprising:

(A) 100 parts by weight of a linear polyfluoro compound having at least two alkenyl groups per molecule and a perfluoropolyether structure in its main chain, (B) a fluorinated organohydrogensiloxane having at least two silicon-bonded hydrogen atoms (i.e., SiH groups) per molecule, in an amount to provide 0.5 to 3.0 moles of SiH groups per mole of alkenyl groups on component (A), (C) a platinum group metal-based hydrosilylation catalyst in an amount to provide 0.1 to 500 ppm of platinum group metal, (D) 0.5 to 30 parts by weight of hydrophobic silica powder, (E) 0.05 to 3.0 parts by weight of a fluorinated acetylene alcohol, and (F) 0.1 to 10 parts by weight of an organosiloxane containing at least one silicon-bonded hydrogen atom and at least one epoxy and/or trialkoxysilyl group bonded to a silicon atom via a carbon atom or via carbon and oxygen atoms per molecule.

In a preferred embodiment, component (A) is a partially branched linear polyfluoro compound of the general formula (1), $$CH_2=CH-(X)_a-Rf^1-(X')_a-CH=CH_2 \quad (1)$$

Herein X is $-CH_2-$, $-CH_2O-$, $-CH_2OCH_2-$ or $-Y-NR^1-CO-$, wherein Y is $-CH_2-$ or an o-, m- or p-dimethylsilylphenylene group of the structural formula (Z):

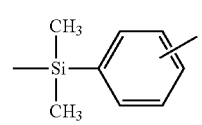

and $R^1$ is hydrogen or a substituted or unsubstituted monovalent hydrocarbon group; X' is $-CH_2-$, $-OCH_2-$, —CH₂OCH₂— or —CO—NR²—Y'—, wherein Y' is —CH₂— or an o-, m- or p-dimethylsilylphenylene group of the structural formula (Z'):

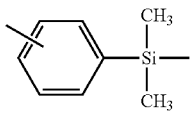

and R² is as defined for R¹; "a" is independently 0 or 1; and Rf¹ is a divalent perfluoropolyether group of the general formula (i) or (ii);

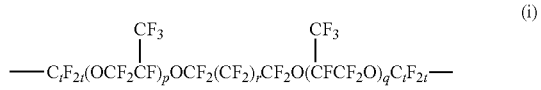

wherein p and q each are an integer from 1 to 150, the sum p+q is from 2 to 200 on average, r is an integer from 0 to 6, and t is 2 or 3,

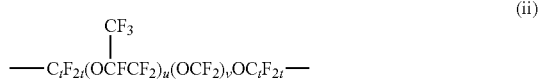

wherein u is an integer from 1 to 200, v is an integer from 1to 50 and t is as defined above.

In a preferred embodiment, the fluorinated oxganohydrogensiloxane (B) contains at least one monovalent perfluoroalkyl, monovalent perfluorooxyalkyl, divalent perfluoroalkylene or divalent perfluorooxyalkylene group per molecule.

In a preferred embodiment, the fluorinated acetylene alcohol (E) has the general formula (2) or (3).

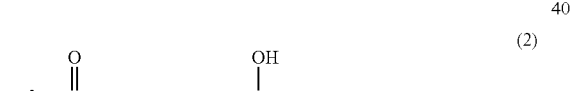

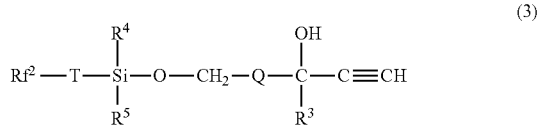

Herein Rf² is a perfluoroalkyl group of 3 to 100 carbon atoms, which may be separated by an ether bond and which may be branched, Q is a divalent hydrocarbon group of 1 to 6 carbon atoms, R³, R⁴ and R⁵ are each independently an alkyl group of 1 to 4 carbon atoms, and T is a divalent organic group of 1 to 20 carbon atoms.

In a preferred embodiment, the organosiloxane (F) has at least one monovalent perfluoroalkyl or monovalent perfluorooxyalkyl group which is bonded to a silicon atom through a divalent linking group containing a carbon atom or carbon and oxygen atoms.

ADVANTAGEOUS EFFECTS OF INVENTION

The adhesive composition is cured by heating at a relatively low temperature for a short time. The cured composition establishes a tenacious bond to a wide variety of substrates including metals and plastics, has many advantages including solvent resistance, chemical resistance, heat resistance, low-temperature properties, low moisture permeability, and electric properties, and presents a smooth and uniform surface. Since the adhesive composition has good curability and shelf stability as well, it is suited for use in coating and potting applications for electric/electronic components where long-term protective performance is required.

DESCRIPTION OF EMBODIMENTS

In the disclosure, the singular forms "a," "an" and "the" include plural referents unless the context clearly dictates otherwise. As used herein, the notation (Cn-Cm) means a group containing from n to m carbon atoms per group. The abbreviation "Me" stands for methyl, "Ph" for phenyl, "Ph'" for phenylene, "pbw" for parts by weight, "ppm" for parts by weight per million parts by weight, and GPC for gel permeation chromatography.

Component A

Component (A) is a linear polyfluoro compound having at least two alkenyl groups per molecule and a perfluoropolyether structure in its main chain, which is preferably represented by the general formula (1).

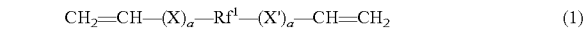

Herein X is —CH2—, —CH₂O—, —CH₂OCH₂— or —Y—NR¹—CO—, wherein Y is —CH₂— or an o-, m- or p-dimethylsilylphenylene group of the structural formula (Z):

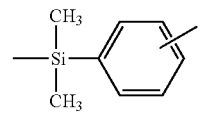

and R¹ is hydrogen or a substituted or unsubstituted monovalent hydrocarbon group. X' is —CH₂—, —OCH₂—, —CH₂OCH₂— or —CO—NR²—Y'—, wherein Y' is —CH₂— or an o-, m- or p-dimethylsilylphenylene group of the structural formula (Z'):

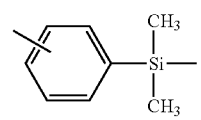

and R² is a group like R¹. Rf¹ is a divalent perfluoropolyether group, and "a" is independently 0 or 1.

R¹ and R² each are a hydrogen atom or a monovalent hydrocarbon group, preferably of 1 to 12 carbon atoms, and more preferably 1 to 10 carbon atoms. Exemplary hydrocarbon groups include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all hydrogen atoms are substituted toy halogen atoms such as fluorine.

Rf¹ is a divalent perfluoropolyether group, preferably having the general formula (i) or (ii).

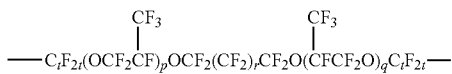
(i)

Herein p and q each are an integer from 1 to 150, preferably 10 to 100, the sum p+q is on average from 2 to 200, preferably 20 to 160, r is an integer from 0 to 6, preferably 0 to 4, and t is 2 or 3.

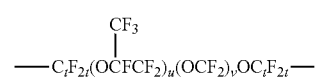
(ii)

Herein u is an integer from 1 to 200, preferably 20 to 160, v is an integer from 1 to 50, preferably 5 to 40, and t is as defined above.

Preferred examples of the Rf¹ group include those of the following three formulas, with the divalent groups of the first formula being more preferred.

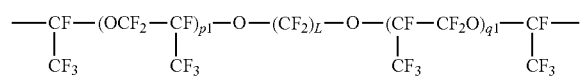

Herein p1 and q1 each are an integer of 1 to 150, p1+q1 is from 2 to 200 on average, and L is an integer of 2 to 6.

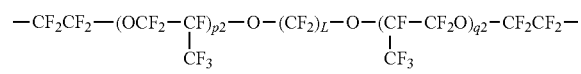

Herein p2 and q2 each are an integer of 1 to 150, p2+q2 is from 2 to 200 on average, and L is an integer of 2 to 6,

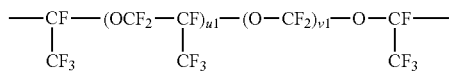

Herein u1 is an integer of 1 to 200, and v1 is an integer of 1 to 50.

Preferred as component (A) are compounds of the general formula (4).

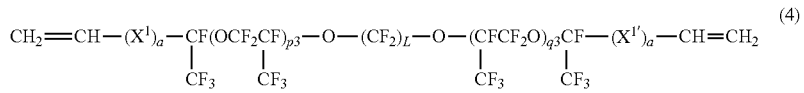
(4)

Herein, $X^1$ is —CH2—, —CH$_2$O—, —CH$_2$OCH$_2$— or —Y—NR$^{21}$—CO—, wherein Y is —CH$_2$— or an o-, m- or p-dimethylsilylphenylene group of the structural formula (Z):

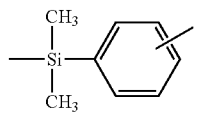
(Z)

and R$^{21}$ is hydrogen, methyl, phenyl or allyl; X$^{1'}$ is —CH$_2$—, —OCH$_2$—, —CH$_2$OCH$_2$— or —CO—NR$^{22}$—Y'—, wherein Y' is —CH$_2$— or an o-, m- or p-dimethylsilylphenylene group of the structural formula (Z'):

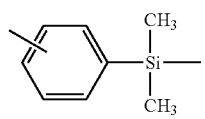
(Z')

and R$^{22}$ is a group like R$^{21}$; the subscript "a" is each independently 0 or 1, L is an integer from 2 to 6, p3 and q3 each are an integer of 1 to 150, and p3+q3 is from 2 to 200 on average.

Examples of the linear polyfluoro compounds of formula (1) include those compounds having the following formulas.

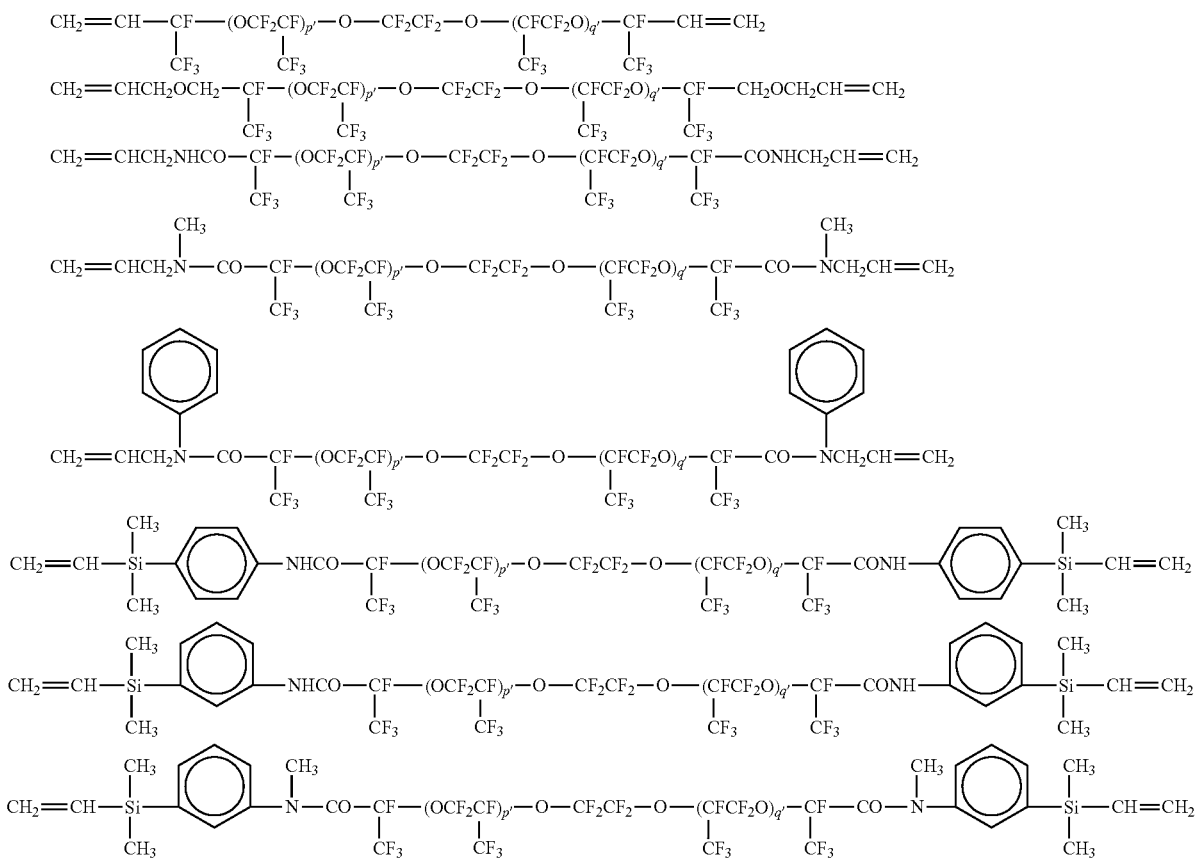

In the above formulas, p' and q' each are an integer of 1 to 150, and the sum p'+q' is from 2 to 200.

Preferably the linear polyfluoro compound of formula (1) has a viscosity at 23° C. in a range of 100 to 100,000 mPa·s, more preferably 500 to 50,000 mPa·s, and even more preferably 1,000 to 20,000 mPa·s, as measured by a rotational viscometer because the composition comprising the same can have appropriate physical properties when used for such purposes as sealing, potting, coating and impregnation, and also in the cured form. An optimum, viscosity for the intended application can he selected from within this viscosity range.

Also preferably the linear polyfluoro compound (A) has a number average molecular weight (Mn) of 1,000 to 35,000, more preferably 4,000 to 30,000, as measured by GPC versus polystyrene standards using 1,3-bis(trifluoromethyl)benzene as solvent. With too low a Mn, the cured product may become brittle and fragile. With too high a Mn, the composition may be less flowable and the cured product may have rather low physical strength.

The linear polyfluoro compound of formula (1) preferably has an alkenyl content of 0.0070 to 0.0500 mol/100 g, more preferably 0.0080 to 0.0400 mol/100 g. With too low an alkenyl content, the cured product may have low physical strength. With too high an alkenyl content, the cured product may become brittle and fragile.

These linear polyfluoro compounds may be used alone or in a combination of two or more thereof.

Component B

Component (B) is a fluorinated organohydrogensiloxane having at least two silicon-bonded hydrogen atoms per molecule. Specifically, it is a fluorinated organobydrogensiloxane having at least one, preferably 1 to 10, fluorinated organic group and at least two, preferably 3 to 50, silicon-bonded hydrogen atoms per molecule. The silicon-bonded hydrogen atom is sometimes referred to as hydrosilyl or SiH group. In the composition, component (B) functions as a crosslinker or chain extender for component (A). For compatibility with and dispersibility in component (A), and uniformity after curing, it is preferable for component (B) to have on the molecule at least one fluorinated group selected from among monovalent perfluoroalkyl groups, monovalent perfluorooxyalkyl groups, divalent perfluoroalkylene groups and divalent perfluorooxyalkylene groups.

Suitable mono- or divalent fluorinated organic groups include those of the following general formulas:

wherein g is an integer from 1 to 20, and preferably from 2 to 10,

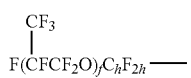

wherein f is an Integer from 1 to 200, and preferably from 1 to 100, and h is an integer from 1 to 3,

wherein i and j each are an integer of at least 1, preferably 1 to 100, the sum i+j is on average from 2 to 200, and preferably 2 to 100, and

wherein d and e each are an integer from 1 to 50, preferably 1 to 40.

Divalent linkages for linking the above perfluoroalkyl, perfluorooxyalkyl, perfluoroalkylene or perfluorooxyalkylene groups with silicon atoms include alkylene groups, arylene groups and combinations thereof, which may be separated by an ether-bonding oxygen atom, amide bond, carbonyl bond, ester bond, diorganosilylene group or the like. Specific examples include divalent linkages having 2 to 12 carbon atoms, such as —$CH_2CH_2$—, —$CH_2CH_2CH_2$—, —$CH_2CH_2CH_2OCH_2$—, —$CH_2CH_2CH_2$—NH—CO—, —$CH_2CH_2CH_2$—N(Ph)-CO—, —$CH_2CH_2CH_2$—N($CH_3$)—CO—, —$CH_2CH_2CH_2$—N($CH_2CH_3$)—CO—, —$CH_2CH_2$—Si($CH_3$)$_2$-Ph'-N($CH_3$)—CO—, —$CH_2CH_2CH_2$—Si($CH_3$)$_2$-Ph'-N($CH_3$)—CO—, and —$CH_2CH_2CH_2$—O—CO—.

In addition to the mono- or divalent fluorinated organic group and silicon-bonded hydrogen atom, the fluorinated organohydrogensiloxane (B) may contain another monovalent substituent group bonded to a silicon atom. Suitable other substituent groups are substituted or unsubstituted hydrocarbon groups of 1 to 20 carbon atoms, preferably 1 to 12 carbon atoms including alkyl groups such as methyl, ethyl, propyl, butyl, hexyl, cyclohexyl, octyl, and decyl, alkenyl groups such as vinyl and allyl, aryl groups such as phenyl, tolyl and naphthyl, aralkyl groups such as benzyl and phenylethyl, and substituted forms of the foregoing in which some or all hydrogen atoms are substituted by chlorine atoms, cyano groups or the like, such as chloromethyl, chloropropyl, and cyanoethyl.

The fluorinated organohydrogensiloxane (B) may be cyclic, chain-like, three-dimensional network or combinations thereof. Although the number of silicon atoms in the fluorinated organohydrogensiloxane is not particularly limited, it is generally from 2 to about 60, preferably from 3 to about 30.

Illustrative examples of component (B) having a mono- or divalent fluorinated organic group and silicon-bonded hydrogen atom include the following compounds.

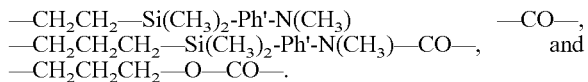

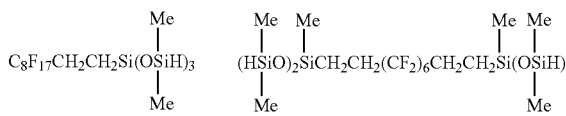

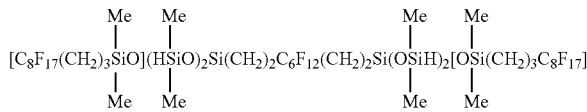

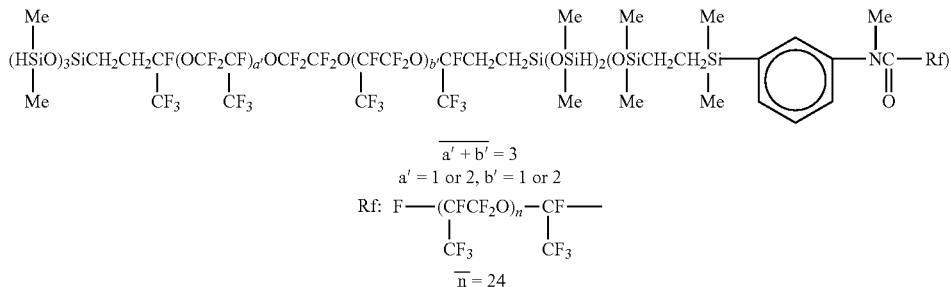

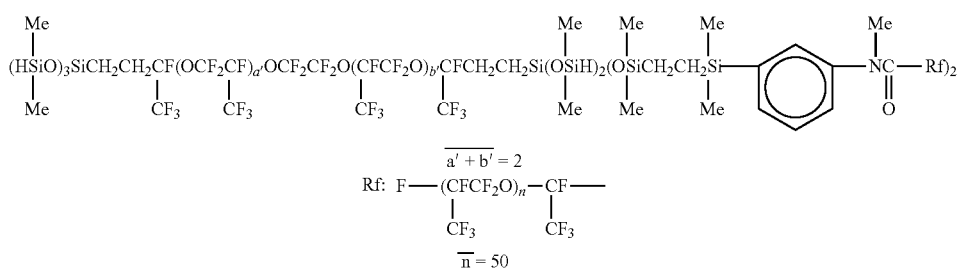

-continued
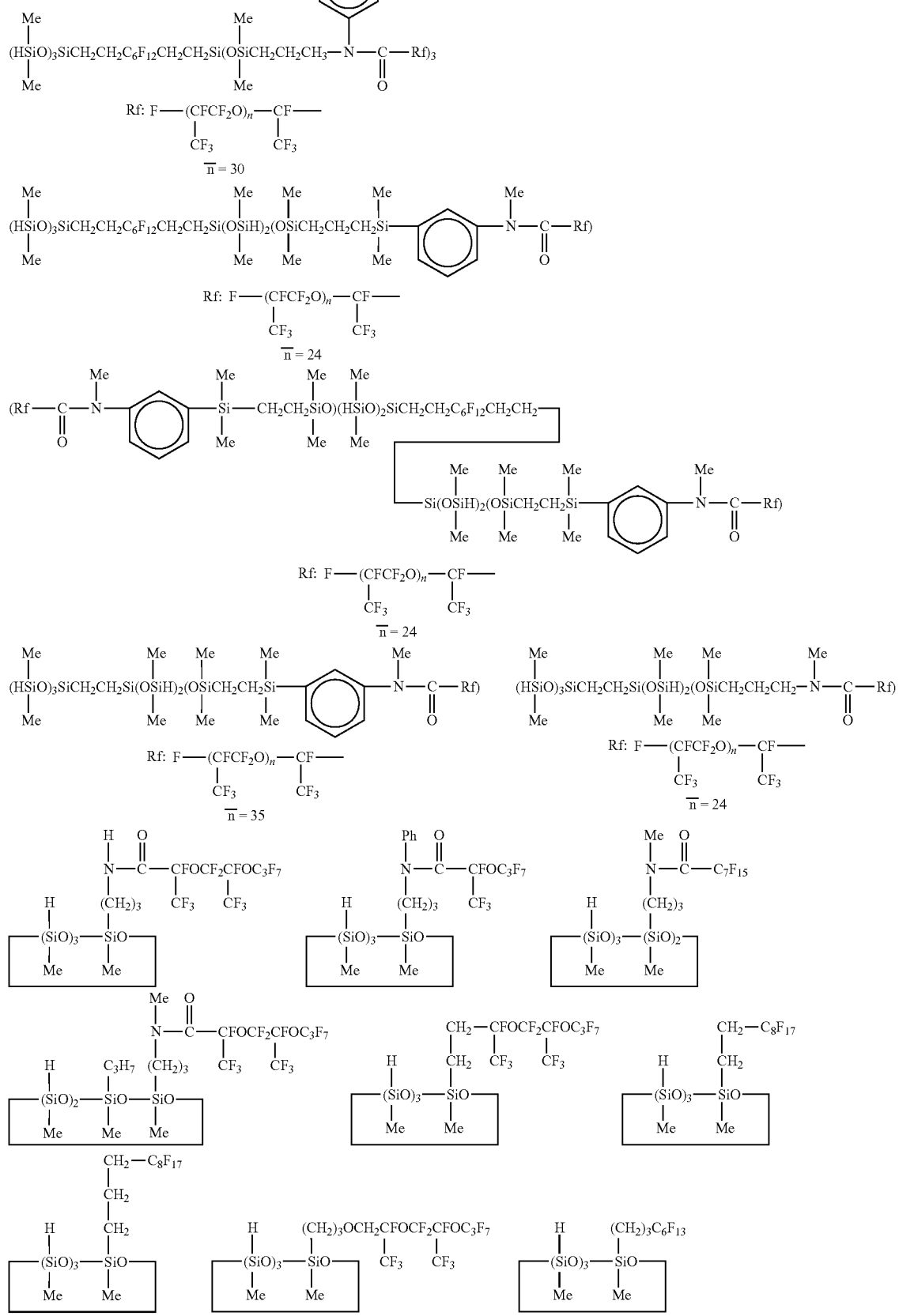

-continued
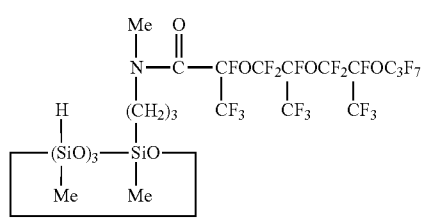 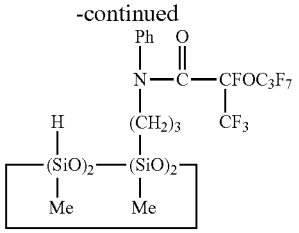 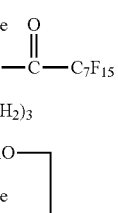
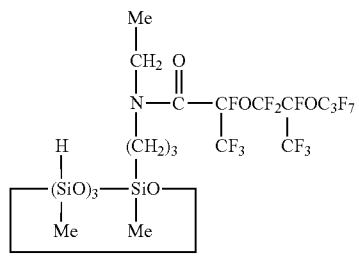
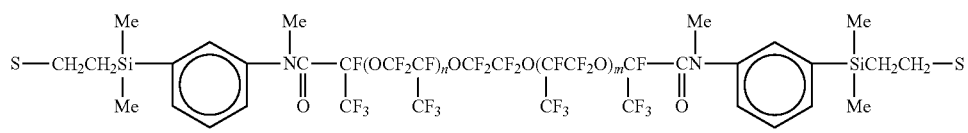
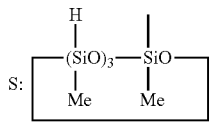
$\overline{n+m}$ = 2 to 50
n = 1 to 50, m = 1 to 50
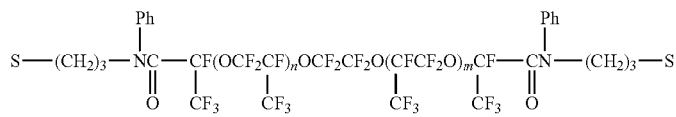
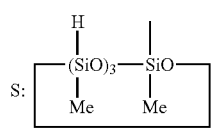
$\overline{n+m}$ = 2 to 50
n = 1 to 50, m = 1 to 50
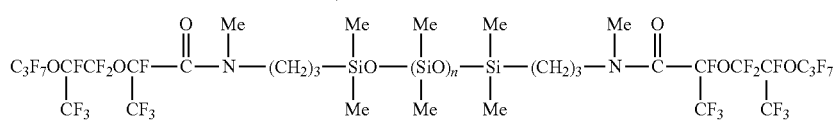
$\overline{n}$ = 3 to 50
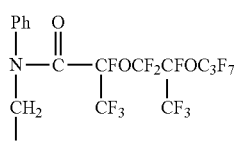
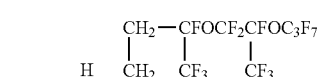
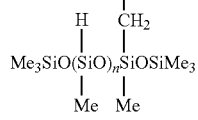 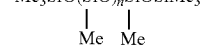 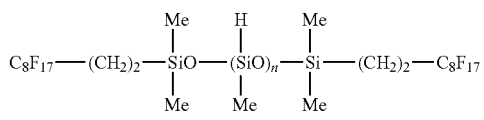
$\overline{n}$ = 3 to 50     $\overline{n}$ = 3 to 50     $\overline{n}$ = 3 to 50

-continued

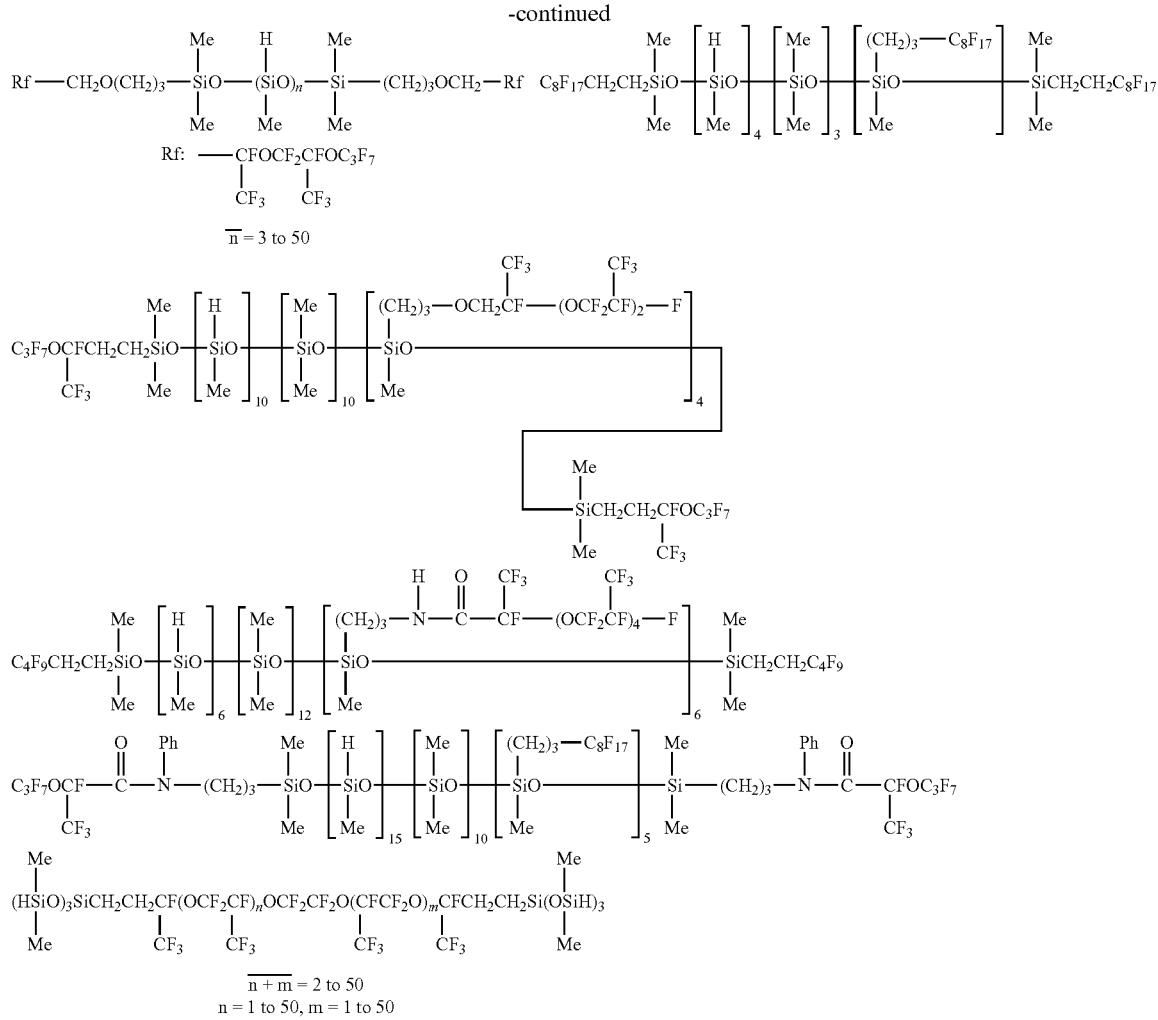

The fluorinated organohydrogensiloxane (B) preferably has a SiH content of 0.00050 to 0.01000 mol/g, more preferably 0.00100 to 0.00800 mol/g. With too low a SiH content, the cured product may have an insufficient crosslinking density and poor physical properties. With too high a SiH content, foaming may occur upon curing, and the cured product has physical properties which may largely change with time.

The fluorinated organohydrogensiloxanes may be used singly or as combinations of two or more thereof.

Component (B) is blended in an amount effective for curing component (A), and specifically a sufficient amount to provide 0.5 to 3.0 moles, and preferably 0.8 to 2.0 moles of hydrosilyl (SiH) groups per mole of alkenyl groups (e.g., vinyl, allyl or cycloalkenyl) on component (A). Too few hydrosilyl (≡Si—H) groups may lead to an insufficient crosslinking density, failing to obtain a properly cured product. Too many hydrosilyl groups may result in foaming during the curing step.

Component C

Component (C) is a platinum group metal based catalyst which is a hydrosilylation reaction catalyst. The hydrosilylation catalyst promotes addition reaction between alkenyl groups in component (A) and hydrosilyl groups in component (B). The hydrosilylation catalysts are generally noble metals or compounds thereof, and thus expensive. Of these, platinum or platinum compounds are often used because they are readily available.

Exemplary platinum compounds include chloroplatinic acid and complexes of chloroplatinic acid with olefins (e.g., ethylene), alcohols and vinyl siloxanes, and metallic platinum on supports such as silica, alumina and carbon. Known platinum group metal catalysts other than platinum compounds include rhodium, ruthenium, iridium and palladium compounds, for example, $RhCl(PPh_3)_3$, $RhCl(CO)(PPh_3)_2$, $RU_3(CO)_{12}$, $IrCl(CO)(PPh_3)_2$ and $Pd(PPh_3)_6$.

If these catalysts are solid catalysts, they may be used in a solid state. A more uniform cured product may be obtained by previously dissolving chloroplatinic acid or a complex thereof in a suitable solvent so that the resulting solution is compatible with the linear polyfluoro compound (A).

Component (C) may be used in a catalytic amount, which typically corresponds to 0.1 to 500 ppm, preferably 1 to 100 ppm of platinum group metal based on the weight of component (A).

Component D

Component (D) is hydrophobic silica powder, which serves to provide the cured product of the composition with appropriate physical strength and assists in uniformly dispersing the organosiloxane (F) to be described later in the composition. It is typically obtained from hydrophobic treatment of a silica fine powder having a BET specific surface area of at least 50 $m^2/g$, specifically 50 to 400 $m^2/g$, which is well known as the filler for silicone rubber.

If the BET specific surface area is less than 50 m²/g, the cured product may have insufficient physical strength and component (F) may be dispersed non-uniformly. A powder with a surface area of more than 400 m²/g is difficult to knead with other components, resulting in non-uniform dispersion of component (D). Examples of the silica fine powder include fumed silica, precipitated silica, and colloidal silica, with fumed silica being most preferred.

The silica fine powder is treated with a hydrophobic agent. Suitable hydrophobic agents include organochlorosilanes, organodisilazanes, cyclic organopolysilazanes, and linear organopolysiloxanes. Inter alia, organochlorosilanes, organodisilazanes, and cyclic organopolysilazanes are preferred.

Component (D) is blended in an amount of 0.5 to 30 parts, preferably 1 to 25 parts by weight per 100 parts by weight of component (A). With less than 0.5 pbw of component (D), the cured product has low physical strength and unstable adhesion. With more than 30 pbw of component (D), the composition is less flowable and the cured product has rather low physical strength.

Component E

Component (E) is a fluorinated acetylene alcohol which serves as a regulator for hydrosilylation reaction. Inclusion of component (E) is effective for providing the composition with appropriate curability and shelf stability, and also the cured product thereof with good adhesion and surface planarity. Component (E) is an acetylene alcohol having a perfluoroalkyl group which may contain an ether bond or be branched. Preferably the fluorinated acetylene alcohol has the general formula (2) or (3).

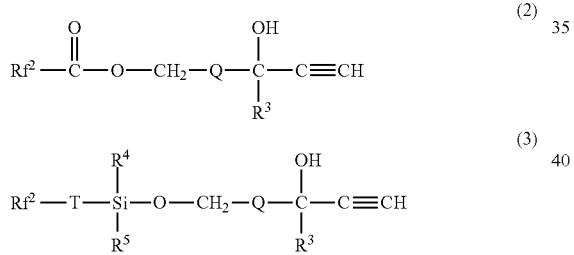

Herein $Rf^2$ is a perfluoroalkyl group of 3 to 100 carbon atoms which may be separated by an ether bond and which may be branched, Q is a divalent hydrocarbon group of 1 to 6 carbon atoms, $R^3$, $R^4$, and $R^5$ are each independently an alkyl group of 1 to 4 carbon atoms, and T is a divalent organic group of 1 to 20 carbon atoms.

Exemplary of $Rf^2$ in formulae (2) and (3) are the following structures wherein n1 and m1 are integers in the indicated range.

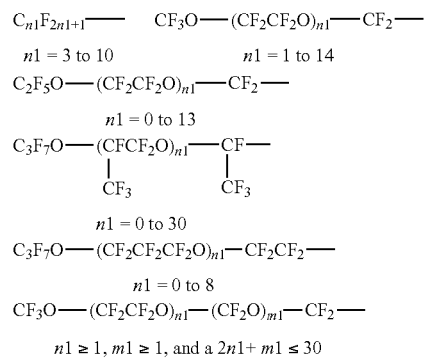

Q is a divalent $C_1$-$C_6$ hydrocarbon group, for example, methylene, ethylene, n-propylene, n-butylene, isobutylene, and phenylene. Inter alia, methylene and ethylene are preferred.

$R^3$, $R^4$, and $R^5$ are each independently $C_1$-$C_4$ alkyl, for example, methyl, ethyl, n-propyl, isopropyl, n-butyl, isobutyl or t-butyl. Preferably $R^3$ is methyl or ethyl, more preferably methyl, and $R^4$ and $R^5$ are methyl or n-butyl.

T is a divalent organic group of 1 to 20 carbon atoms. The divalent organic group is not particularly limited as long as the carbon count is 1 to 20. An oxygen atom, nitrogen atom, carbonyl radical or the like may intervene in the organic group. Exemplary of T are the following structures:

—$(CH_2)_M$— wherein M is an integer of 1 to 10, preferably 2 to 4,

—$CH_2$—O—$(CH_2)_N$— wherein N is an integer of 1 to 9, preferably 2 to 4,

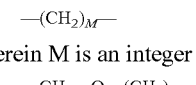
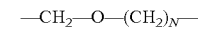

wherein $R^6$ and $R^7$ are each independently hydrogen or $C_1$-$C_9$ alkyl (e.g. methyl, ethyl, propyl or cyclohexyl),

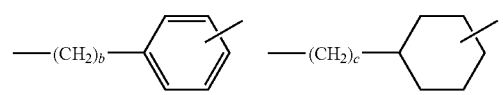

wherein b and c each are 0 or an integer of 1 to 4, preferably 0, 1 or 2.

Illustrative examples of the fluorinated acetylene alcohol (E) are given by the following structural formulae.

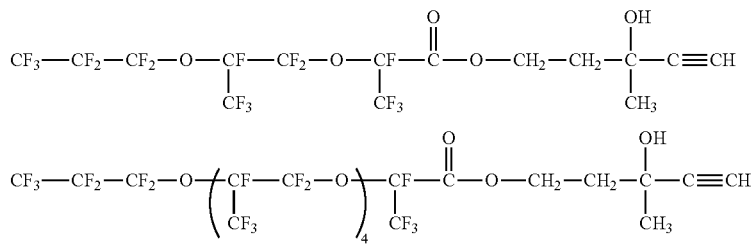

-continued

Component (E) is blended in an amount of 0.05 to 3.0 parts, preferably 0.1 to 2.0 parts by weight per 100 parts by weight of component (A). With less than 0.05 pbw of component (E), the composition is less stable during shelf storage and less adhesive. More than 3.0 pbw of component (E) may inhibit the composition from curing and the cured product may have poor physical properties.

Component F

Component (F) is an organosiloxane which is compounded for helping the composition develop self-adhesion. The organosiloxane has in the molecule at least one silicon-bonded hydrogen atom (SiH group) and at least one epoxy group and/or trialkoxysilyl group bonded to a silicon atom via carbon atoms or carbon and oxygen atoms, and preferably further has at least one monovalent perfluoroalkyl or perfluorooxyalkyl group bonded to a silicon atom via a divalent linkage containing carbon atoms or carbon and oxygen atoms.

The organosiloxane (F) has a siloxane structure which may be cyclic, chain-like or branched or a mixture thereof. Suitable examples of the organosiloxane (F) are those of the following average compositional formulae.

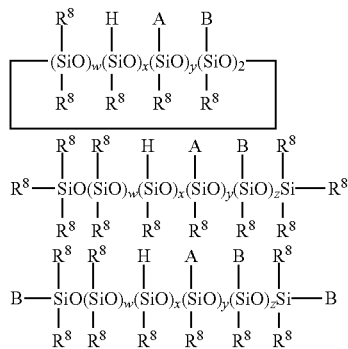

Herein $R^8$ is independently an unsubstituted or halo-substituted monovalent hydrocarbon group, A is an epoxy group or trialkoxysilyl group bonded to a silicon atom via carbon atoms or carbon and oxygen atoms, B is a perfluoroalkyl or perfluorooxyalkyl group bonded to a silicon atom via carbon atoms or carbon and oxygen atoms, w is an integer of 0 to 100, x is an integer of 1 to 100, y is an integer of 1 to 100, and z is an integer of 0 to 100.

Suitable unsubstituted or halo-substituted monovalent hydrocarbon groups represented by $R^8$ are of 1 to 10 carbon atoms, preferably 1 to 8 carbon atoms, and include alkyl groups such as methyl, ethyl, propyl, butyl, hexyl, cyclahexyl and octyl; aryl groups such as phenyl and tolyl; aralkyl groups such as benzyl and phenylethyl; and substituted forms of the foregoing groups in which some or all hydrogen atoms are substituted by halogen atoms such as fluorine. Inter alia, methyl is most preferred.

It is preferred that w be an integer of 0 to 20, x be an integer of 1 to 20, y be an integer of 1 to 20, z be an integer of 1 to 20, and w+x+y+z be 3 to 50.

A is an epoxy group or trialkoxysilyl group bonded to a silicon atom via carbon atoms or carbon and oxygen atoms, which is exemplified by groups of the following formulae.

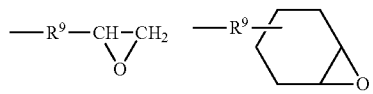

Herein $R^9$ is a divalent hydrocarbon group of 1 to 10 carbon atoms, more specifically 1 to 5 carbon atoms, which may be separated by an oxygen atom. Exemplary are alkylene groups such as methylene, ethylene, propylene, butylene, hexylene or octylene, cycloalkylene groups such as cyclohexylene, and oxyalkylene groups such as oxyethylene, oxypropylane and oxybutylene.

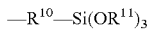

Herein $R^{10}$ is a divalent hydrocarbon group of 1 to 10 carbon atoms, more specifically 1 to 4 carbon atoms, for example, alkylene such as methylene, ethylene, propylene, butylene, hexylene, cyclohexylene or octylene. $R^{11}$ is independently a monovalent hydrocarbon group of 1 to 8 carbon atoms, more specifically 1 to 4 carbon atoms, for example, alkyl such as methyl, ethyl, n-propyl, isopropyl, n-butyl, isobutyl and tert-butyl.

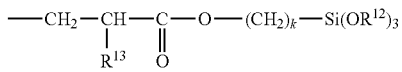

Herein $R^{12}$ is independently a monovalent hydrocarbon group of 1 to 8 carbon atoms, more specifically 1 to 4 carbon atoms, for example, alkyl such as methyl, ethyl, n-propyl, isopropyl, n-butyl, isobutyl and tert-butyl; $R^{13}$ is hydrogen or methyl; and k is an integer of 2 to 10, preferably 2 to 6.

Examples of the group represented by A are given below.

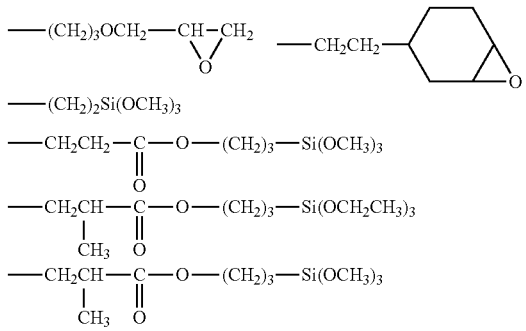

B is a monovalent perfluoroalkyl or perfluorooxyalkyl group bonded to a silicon atom via a divalent linking group containing carbon atoms or carbon and oxygen atoms. Exemplary monovalent perfluoroalkyl or perfluorooxyalkyl groups include those of the following general formulae.

$$C_9F_{2g+1}-$$

Herein g is as defined above.

Herein f and h are as defined above.

The divalent linking group containing carbon atoms or carbon and oxygen atoms may be an alkylene group, arylene group or a combination thereof, which may be separated by an ether-bonding oxygen atom, amide bond, carbonyl bond or the like. Suitable divalent linking groups of 2 to 12 carbon atoms include —$CH_2CH_2$—, —$CH_2CH_2CH_2$—, —$CH_2CH_2CH_2OCH_2$—, —$CH_2CH_2CH_2$—NH—CO—, —$CH_2CH_2CH_2$—N($CH_3$)—CO—, and —$CH_2CH_2CH_2$—N(Ph)-CO—.

Examples of the group represented by B are given below.

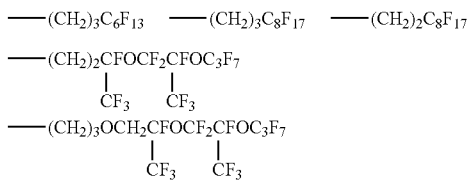

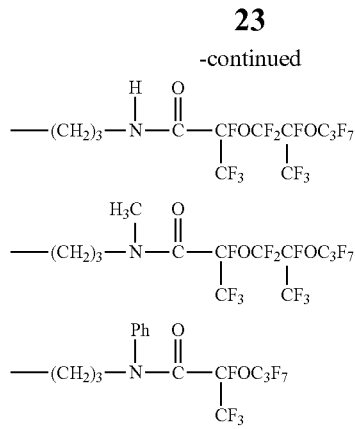

The organosiloxane as component (F) may be obtained by combining an organohydrogenpolysiloxane having at least three silicon-bonded hydrogen atoms (SiH groups) in the molecule with a compound having an aliphatic unsaturated group (e.g., vinyl or allyl) and an epoxy and/or trialkoxysilyl group and optionally, a compound having an aliphatic unsaturated group and a perfluoroalkyl or perfluorooxyalkyl group and effecting partial addition reaction therebetween in accordance with a standard procedure. The amounts of the reactants combined should be such that the number of aliphatic unsaturated groups be smaller than the number of SiH groups.

In the preparation of the organosiloxane, the end compound may be isolated from the reaction mixture at the end of reaction although the reaction mixture may be used as long as the unreacted reactants and addition reaction catalyst have been removed therefrom.

Suitable organosiloxanes which can serve as component (F) include those of the following structural formulae, which may be used alone or in admixture.

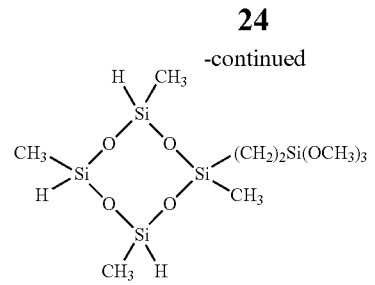

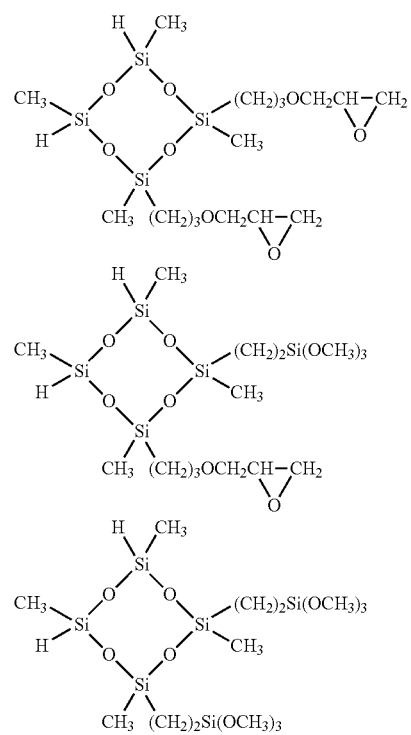

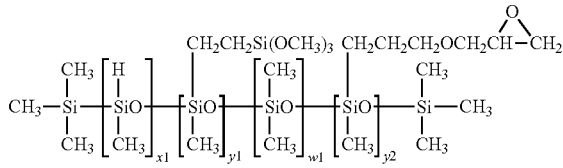

Herein x1 is 1 to 8, y1 is 1 to 3, w1 is 1 to 4, and y2 is 1 to 3.

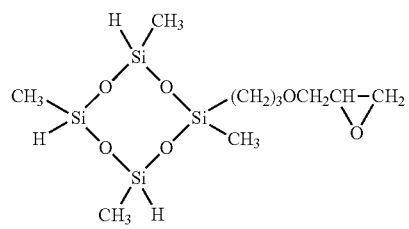

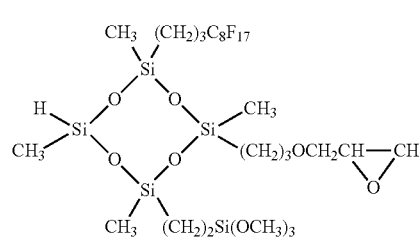

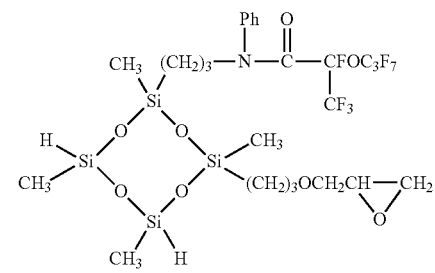

-continued
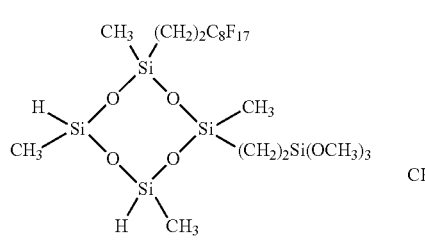
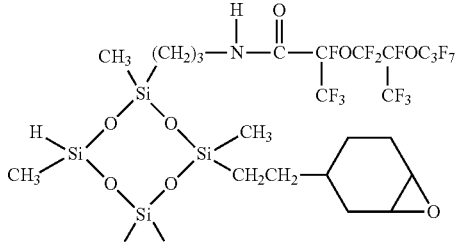
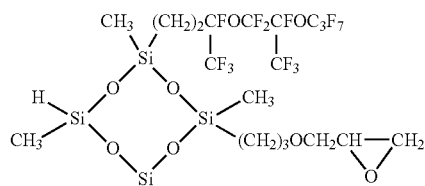
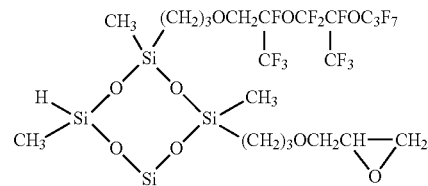
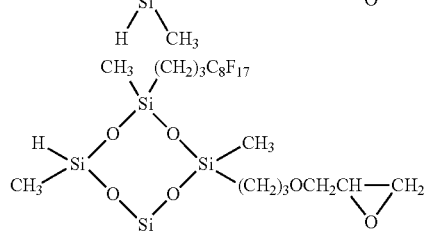
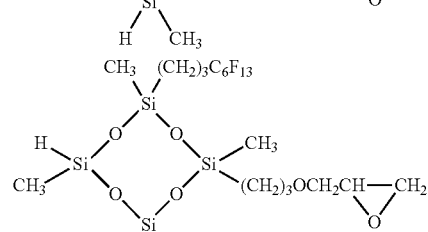
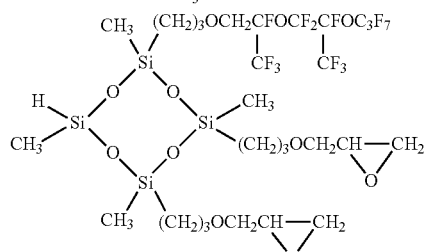
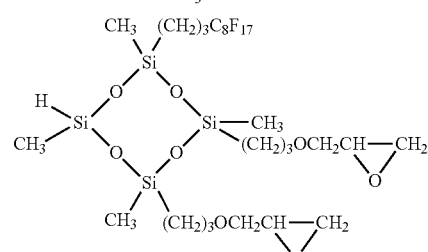
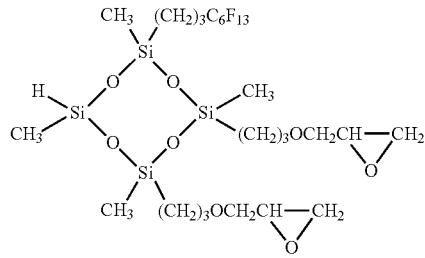
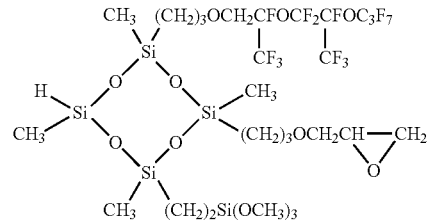
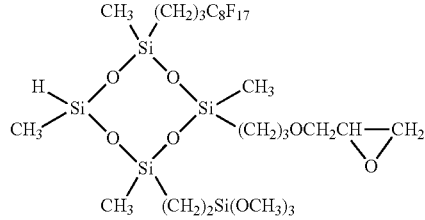
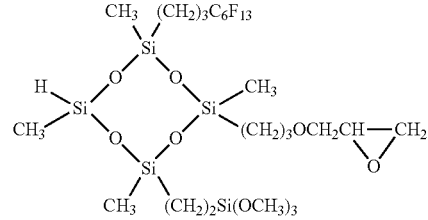
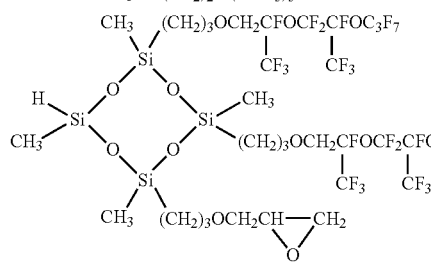
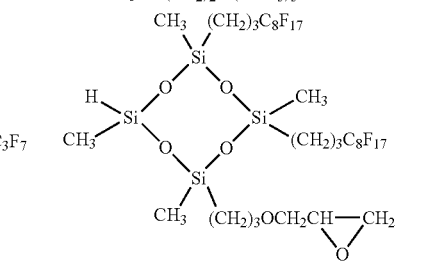

-continued

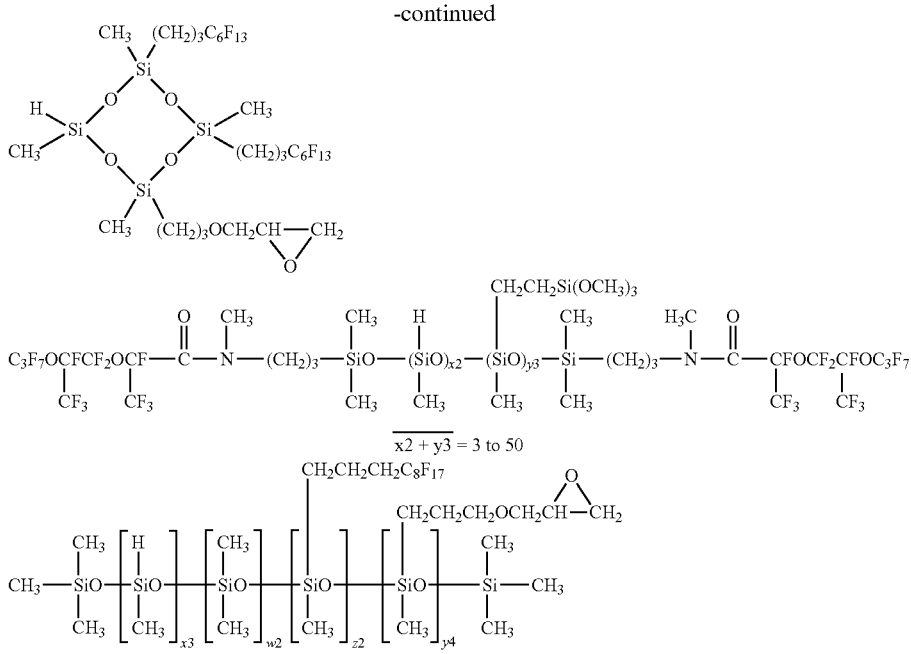

Herein x3 is 1 to 8, w2 is 1 to 4, z2 is 1 to 3, and y4 is 1 to 3.

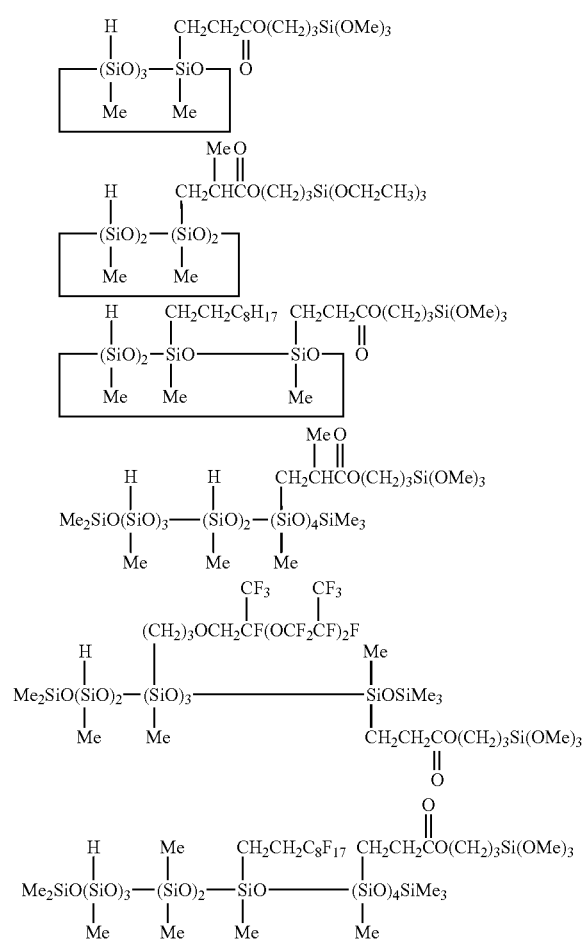

Component (F) is used in an amount of 0.1 to 10 parts, and preferably 0.2 to 5 parts by weight per 100 parts by weight of component (A). Less than 0.1 pbw of component (F) may fail to achieve satisfactory adhesion whereas more than 10 pbw may interfere with the flow, often interfere with the cure of the composition, and have a negative impact on the physical strength of the cured composition.

Other Components

In addition to the aforementioned components (A) to (F), various additives such as a plasticizer, viscosity modifier, flexibilizer, inorganic filler, tackifier, adhesion auxiliary (other than F), and silane coupling agent may be added to the composition for enhancing its commercial utility. Such additives are compounded in any desired amounts as long as they do not compromise the objects of the invention or adversely affect the properties of the composition and the physical properties of the cured composition.

As the plasticizer, viscosity modifier or flexibilizer, a polyfluoromonoalkenyl compound having the general formula (5) and/or linear polyfluoro compounds having the general formulae (6) and (7) may be used.

$$Rf^3-(X')_a-CH=CH_2 \quad (5)$$

Herein X' and a are as defined above, and $Rf^3$ is a group of the general formula (iii):

$$F(CFCF_2O)_{f1}C_tF_{2t}- \quad (iii)$$
$$\phantom{F(}CF_3$$

wherein f1 is an integer of at least 1, preferably 2 to 100, and t is as defined above and smaller than the sum of p+q (on average) and r and also smaller than the sum of u and v, as defined for $Rf^1$ in formula (1) of component (A).

Herein D is a group: $C_sF_{2s+1}$— wherein s is 1 to 3, and c1 is an integer of 1 to 200, preferably 2 to 100 and smaller than the sum of p+g (on average) and r and also smaller than the sum of u and v, as defined for $Rf^1$ in formula (1) of component (A).

Herein D is as defined above, d1 and e1 each are an integer of 1 to 200, preferably 1 to 100, and the sum d1+e1 is smaller than the sum of p+g (on average) and r and also smaller than the sum of u and v, as defined for $Rf^1$ in formula (1) of component (A).

Examples of the polyfluoromonoalkenyl compound of formula (5) are given below wherein f1' meets the above requirement.

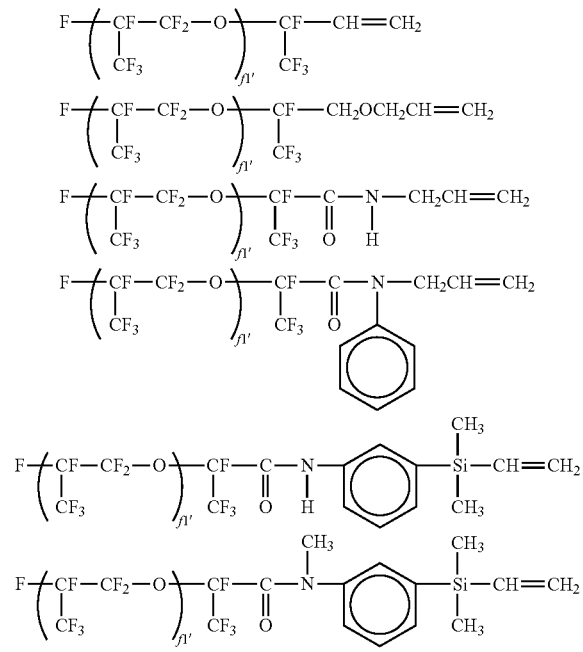

Examples of the linear polyfluoro compounds having the general formulae (6) and (7) are given below wherein c1' and the sum d1'+e1' meet the above requirements.

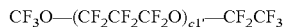

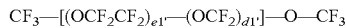

Herein c1' is an integer of 1 to 200, d1' is an Integer of 1 to 200, e1' is an integer of 1 to 200, and the sum d1'+e1' is 2 to 200.

When added, an amount of the polyfluoro compound having formula (5), (6) or (7) is preferably 1 to 300 parts, more preferably 50 to 250 parts by weight per 100 parts by weight of component (A). The polyfluoro compound desirably has a viscosity of 5 to 100,000 mPa·s at 23° C., as measured by a rotational viscometer, for the same reason as described for the polyfluorodialkenyl compound (A).

Examples of the inorganic filler include reinforcing or semi-reinforcing fillers such as quartz flour, fused quarts flour, diatomaceous earth and calcium carbonate; inorganic pigments such as titanium oxide, iron oxide, carbon black, and cobalt aluminate; heat resistance improvers such as titanium oxide, iron oxide, carbon black, cerium oxide, cerium hydroxide, zinc carbonate, magnesium carbonate, and manganese carbonate; heat-conductive fillers such as alumina, boron nitride, silicon carbide and powdered metals; and electroconductive agents such as carbon black, silver powder and electro-conductive zinc white.

Also useful are adhesion promoters such as carboxylic anhydrides and titanic acid esters, tackifiers other than component (F), and silane coupling agents.

Adhesive Composition

The adhesive composition may be prepared by mixing components (A) to (F) and optional components on a mixing device such as planetary mixer, Ross mixer or Hobart mixer or a kneading device such as kneader or three-roll mill until uniform.

The method of preparing the adhesive composition is not particularly limited, and the adhesive composition may be prepared by milling the necessary components together. The adhesive composition may be formulated as one part or two parts which are mixed on use.

In one embodiment, the perfluoropolyether-based adhesive composition is prepared by first blending 100 parts by weight of component (A) with 20 to 60 parts by weight of component (D) at elevated or non-elevated temperature, milling them under heat/vacuum conditions or heat/applied pressure conditions, and diluting the blend with component (A) so as to give the desired blend ratio. With this procedure, the perfluoropolyether-based adhesive composition is improved in adhesion properties.

The preliminary step of blending and milling components (A) and (D) is carried out for the purpose of fully coating surfaces of hydrophobic silica particles as component (D) with the linear polyfluoro compound as component (A) for thereby preventing components (B) and (F) from being adsorbed to the silica surfaces for thereby reducing the viscosity and improving the adhesion of the adhesive composition. The preliminary step may be implemented on a suitable mill such as planetary mixer, gate mixer or kneader.

Although the blending ratio of components (A) and (D) in the preliminary step varies with the type of hydrophobic silica powder as component (D), it is desired that 20 to 60 parts by weight of component (D) be present per 100 parts by weight of component (A). If the amount of component (D) is less than 20 parts, it is difficult to reduce the viscosity of the final composition, that is, the final composition has a very high viscosity. If the amount of component (D) exceeds 60 parts, then exothermic heat generates during milling, causing to deteriorate the mechanical properties of the composition and rendering mechanical milling of powder difficult.

The temperature and time of blending/milling step are not particularly limited as long as the mechanical and physical properties of the adhesive composition are stabilized. Typically the preliminary step is carried out at a temperature of 120 to 180° C. for at least 1 hour until uniform.

The pressure in the preliminary blending/milling step varies with a particular milling device. The preliminary step is carried out under applied or reduced pressure depending on the milling device used. For example, when a planetary mixer or gate mixer is used, milling is under reduced pressure, which is preferably −0.05 MPa or lower in gauge pressure. When a kneader is used, milling is under applied pressure, which is preferably 0.4 to 0.6 MPa in gauge pressure. Milling is carried out under these conditions such that the surface of component (D) may be effectively wetted or coated with component (A).

The liquid base of components (A) and (D) resulting from the preliminary step is then blended with components (A), (B), (C), (E) and (F), yielding the desired perfluoropolyether-based adhesive composition.

Although the adhesive composition thus prepared may cure at room temperature depending on the type and amount of functional group on linear polyfluoro compound (A), the type and amount of catalyst (C), and the type and amount of component (E), it is recommended to heat the composition to promote curing. Preferably the composition is heat cured at a temperature of at least 60° C., more preferably 100 to 200° C. for several minutes to several hours in order to develop tenacious adhesion to various substrates.

In applying the adhesive composition, it may be diluted with a suitable fluorinated solvent in a desired concentration depending on a particular application and intended use. Suitable fluorinated solvents include 1,3-bis(trifluoromethyl)benzene, Fluorinert® (3M), perfluorobutyl methyl ether, perfluorobutyl ethyl ether, perfluoropolyether oligomers, and mixtures thereof. Use of a solvent is recommended in the thin-film coating application.

The compositions of the invention are useful as the adhesive for automotive parts, electric/electronic parts and the like. More illustratively, they are useful as the adhesive sealing, protective coating and potting agents for detectors and sensors used in automobile control systems, such as pressure sensors, gas concentration detectors, and temperature sensors; the protective sealing agent for sensors and instruments exposed to gases, hot water and chemicals; the adhesive for ink jet printers; the adhesive and sealant for printer heads; the coating agent to rolls and belts in laser printers and copiers; and the adhesive sealing, coating and potting agents for various circuit boards.

EXAMPLE

Examples of the invention are given below by way of illustration and not by way of limitation. Parts are by weight. Viscosity and bond strength are measured at 23° C. according to JIS K6249. Mn is number average molecular weight.

Example 1

A planetary mixer was charged with 60 parts of a polymer having formula (8) below (viscosity 10,000 mPa·s, Mn 16,700, vinyl content 0.012 mol/100 g). While the mixer was heated at an internal temperature of 50-100° C., 18 parts of dimethyldichlorosilane-surface-treated fumed silica (BET surface area 110 m$^2$/g) was added in divided portions. With the heat interrupted, kneading was carried out under a reduced pressure (gauge pressure –0.093 MPa) for one hour. With kneading continued, the mixer was heated again until the internal temperature reached 130° C. While the temperature was kept at 130-160° C., the contents were heat treated for 3 hours under a reduced pressure (gauge pressure –0.093 MPa). The contents were cooled below 40° C., after which 40 parts of the polymer having formula (8) was added, and the contents were kneaded for 30 minutes under a reduced pressure (gauge pressure –0.093 MPa). The mixture was taken out and worked 2 passes on a three-roll mill, obtaining a bass compound.

A planetary mixer was charged with 25 parts of solid carboxylic anhydride having formula (9) below and 75 parts of the polymer having formula (8), which were mixed at room temperature for 30 minutes. The contents were further kneaded for 30 minutes under a reduced pressure (gauge pressure –0.093 MPa). The mixture was taken out and worked 2 passes on a three-roll mill, obtaining a carboxylic anhydride paste.

A planetary mixer was charged with 29.5 parts of the base compound, 75.0 parts of the polymer having formula (8), and 0.8 part of the carboxylic anhydride paste, which were mixed until uniform. To the mixture, 0.20 part of a toluene solution of platinum-divinyltetramethyldisiloxane complex (Pt concentration 0.5 wt %) and 0.45 part of a fluorinated acetylene alcohol having formula (10) below were added and mixed until uniform. To the mixture, 1.8 parts of fluorinated organohydrogensiloxane having formula (11) below (SiH content 0.00394 mol/g), 1.2 parts of fluorinated organohydrogensiloxane having formula (12) below (SiH content 0.00722 mol/g), and 2.5 parts of a tackifier having formula (13) below were successively added. These components were mixed until uniform. This was followed by deaeration, yielding a composition.

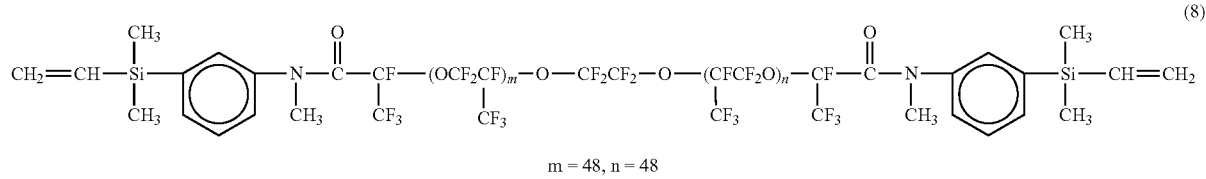

m = 48, n = 48

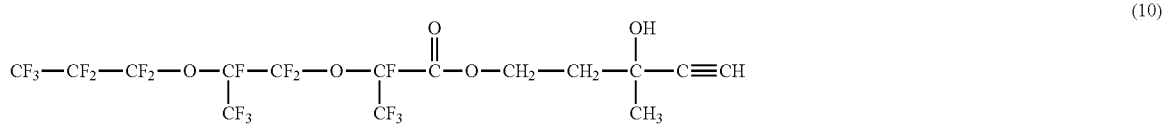

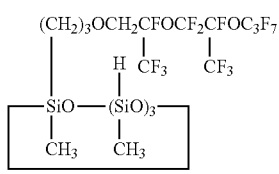

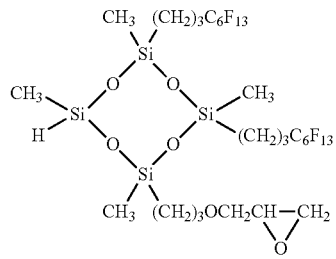

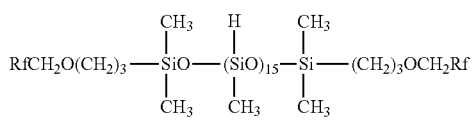

(11)

(12)

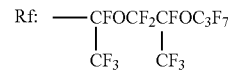

(13)

A dispenser cartridge was filled With the composition. The composition was extruded onto a tetrafluoroethylene plate (50 mm×50 mm×2 mm) and spread by a bar coater so as to form a composition layer of 250 μm thick. The coated plate was heated in a dryer at 150° C. for one hour for curing the coating. Separately, the composition was cast into a glass dish (inner diameter 32 mm, depth 15 mm) to a height or thickness of 2 mm. The dish was heated in a dryer at 150° C. for one hour for curing the composition. The surface of the cured products was observed, with the results shown in Table 1.

The composition, was also examined for curability both immediately after preparation and after storage at 40° C. for 3 weeks. The composition was cured by heating at 15020 C. for one hour before $T_{90}$ value was measured according to JIS K6300-2 using a moving die rheometer (MDR2000 by Alpha Technologies).

A 80 μm thick layer of the composition was sandwiched between two test panels (50 mm×25 mm) of an adherend material (aluminum, stainless steel, nickel, epoxy resin, PBT or PPS resin listed in Table 2), the panels being arranged so as to mutually overlap by 10 mm at the ends. The composition was then cured by heating at 150° C. for one hour, thereby giving an adhesion test specimen. The specimen was subjected to a tensile shear bond test at a pulling speed of 50 mm/min, and the shear bond strength (MPa) and cohesive failure 10 (area %) were determined. The results are shown in Table 2.

Example 2

A composition was prepared as in Example 1 aside from using 0.65 part of fluorinated acetylene alcohol having formula (14) below instead of 0.45 part of fluorinated acetylene alcohol having formula (10) in Example 1. The same tests as in Example 1 were performed, with the results shown in Tables 1 and 2.

(14)

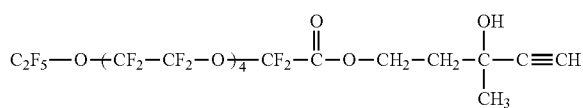

Example 3

A composition was prepared as in Example 1 aside from using 0.40 part of fluorinated acetylene alcohol having formula (15) below instead of 0.45 part of fluorinated acetylene alcohol having formula (10) in Example 1. The same tests as in Example 1 were performed, with the results shown in Tables 1 and 2.

(15)

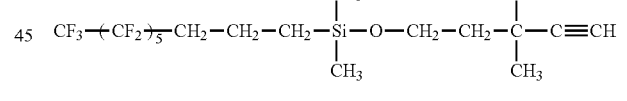

Example 4

A composition was prepared as in Example 1 aside from using 0.60 part of fluorinated acetylene alcohol having formula (16) below instead of 0.45 part of fluorinated acetylene alcohol having formula (10) in Example 1. The same tests as in Example 1 were performed, with the results shown in Tables 1 and 2.

(16)

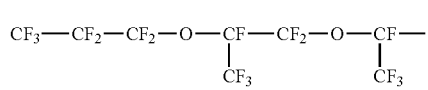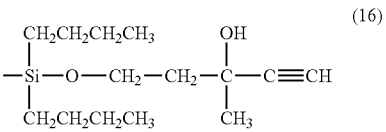

Example 5

A composition was prepared as in Example 1 aside from using 0.50 part of fluorinated acetylene alcohol having formula (17) below instead of 0.45 part of fluorinated acetylene alcohol having formula (10) in Example 1. The same tests as in Example 1 were performed, with the results shown in Tables 1 and 2.

Comparative Example 1

A composition was prepared as in Example 1 aside from using 0.15 part of an isocyanurate having formula (19) below and 0.30 part of a 50 wt % toluene solution of acetylene alcohol having formula (20) below instead of 0.45 part of fluorinated acetylene alcohol having formula (10) in Example 1. The same tests as in Example 1 were performed (exclusive of the tensile shear bond test), with the results shown in Table 3.

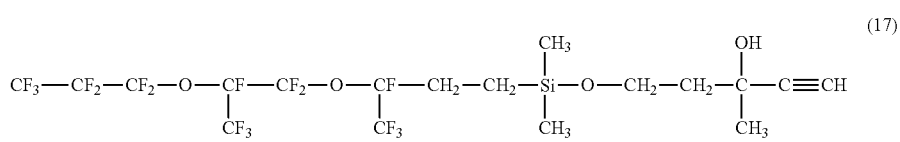
(17)

Example 6

A composition was prepared as in Example 1 aside from using 0.60 part of fluorinated acetylene alcohol having formula (16) in Example 4 instead of 0.45 part of fluorinated acetylene alcohol having formula (10) in Example 1 and 3.0 parts of a tackifier having formula (18) below instead of the tackifier having formula (13) in Example 1. The same tests as in Example 1 were performed, with the results shown in Tables 1 and 2.

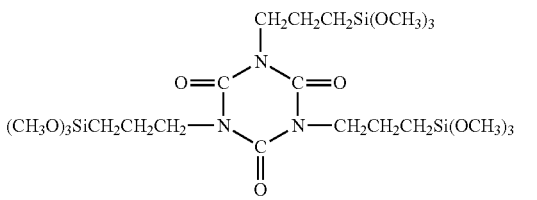
(19)

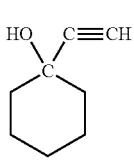
(20)

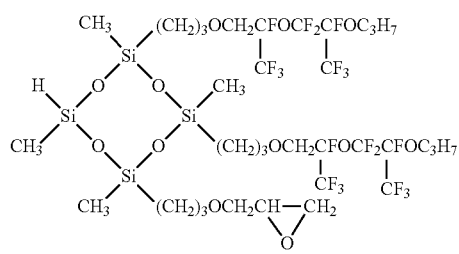
(18)

Comparative Example 2

A composition was prepared as in Example 1 aside from using 0.12 part of an isocyanurate having formula (21) below and 0.30 part of the 50 wt % toluene solution of acetylene alcohol having formula (20) (in Comparative Example 1) instead of 0.45 part of fluorinated acetylene alcohol having formula (10) in Example 1. The same tests as in Example 1 were performed (exclusive of the tensile shear bond test), with the results shown in Table 3.

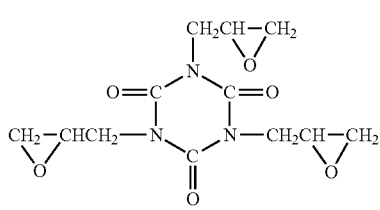

(21)

Comparative Example 3

A composition was prepared as in Example 1 aside from using 0.30 part of the 50 wt % toluene solution of acetylene alcohol having formula (20) (in Comparative Example 1) instead of 0.45 part of fluorinated acetylene alcohol having formula (10) in Example 1. The same tests as in Example 1 were performed (exclusive of the tensile shear bond test), with the results shown in Table 3.

TABLE 1

| | | Example | | | | | |
|---|---|---|---|---|---|---|---|
| | | 1 | 2 | 3 | 4 | 5 | 6 |
| Surface state | Wrinkles | nil | nil | nil | nil | nil | nil |
| | Streaks | nil | nil | nil | nil | nil | nil |
| $T_{90}$ (min) | Initial | 4.0 | 4.6 | 3.8 | 4.4 | 3.9 | 4.3 |
| | After storage | 3.8 | 4.3 | 3.7 | 4.4 | 3.7 | 4.1 |

TABLE 2

| | Shear bond strength | Example | | | | | |
|---|---|---|---|---|---|---|---|
| | (MPa) | 1 | 2 | 3 | 4 | 5 | 6 |
| Adherend | Aluminum | 3.2(100) | 3.5(100) | 3.4(100) | 3.6(100) | 3.3(100) | 3.5(100) |
| | Stainless steel | 2.9(100) | 3.2(100) | 3.2(100) | 3.2(100) | 3.0(100) | 3.1(100) |
| | Nickel | 2.6(100) | 3.0(100) | 2.9(100) | 2.8(100) | 2.7(100) | 2.9(100) |
| | Epoxy resin | 2.4(100) | 2.7(100) | 2.6(100) | 2.6(100) | 2.5(100) | 2.7(100) |
| | PST resin | 2.3(100) | 2.5(100) | 2.4(100) | 2.5(100) | 2.3(100) | 2.6(100) |
| | PPS resin | 2.1(100) | 2.3(100) | 2.2(100) | 2.4(100) | 2.2(100) | 2.4(100) |

Cohesive failure (area %) is given in parentheses.

TABLE 3

| | | Comparative Example | | |
|---|---|---|---|---|
| | | 1 | 2 | 3 |
| Surface state | Wrinkles | nil | nil | found |
| | Streaks | nil | nil | found |
| $T_{90}$ (min) | Initial | 10.8 | 10.5 | 9.9 |
| | After storage | 40.0 | 38.0 | 9.0 |

Japanese Patent Application No. 2012-225707 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An adhesive composition comprising
   (A) 100 parts by weight of a linear polyfluoro compound having a perfluoropolyether structure in its main chain and having at least two alkenyl groups per molecule,
   (B) a fluorinated organohydrogensiloxane having at least two silicon-bonded hydrogen atoms (i.e., SiH groups) per molecule, in an amount to provide 0.5 to 3.0 moles of SiH groups per mole of alkenyl groups on component (A),
   C) a platinum group metal-based hydrosilylation catalyst in an amount to provide 0.1 to 500 ppm of platinum group metal,
   (D) 0.5 to 30 parts by weight of hydrophobic silica powder,
   (E) 0.05 to 3.0 parts by weight of a fluorinated acetylene alcohol having the general formula (2) or (3):

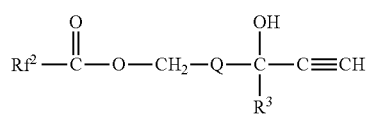

(2)

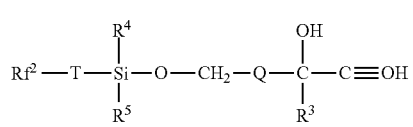

(3)

wherein $Rf^2$ is a perfluoroalkyl group of 3 to 100 carbon atoms, which may be separated by an ether bond and which may be branched, Q is a divalent hydrocarbon group of 1 to 6 carbon atoms, $R^3$, $R^4$ and $R^5$ are each independently an alkyl group of 1 to 4 carbon atoms, and T is a divalent organic group of 1 to 20 carbon atoms, and (F) 0.1 to 10 parts by weight of an organosiloxane containing at least one silicon-bonded hydrogen atom and at least one member selected from the group consisting of epoxy groups and trialkoxysilyl groups bonded to a silicon atom via a carbon atom or via carbon and oxygen atoms per molecule.

2. The adhesive composition of claim 1 wherein component (A) is a partially branched linear polyfluoro compound of the general formula (1):

(1)

wherein X is —$CH_2$—, —$CH_2O$—, —$CH_2OCH_2$— or —Y—$NR^1$—CO—, wherein Y is —$CH_2$— or an o-, m- or p-dimethylsilylphenylene group of the structural formula (Z):

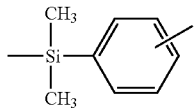

(Z)

and R$^1$ is hydrogen or a substituted or unsubstituted monovalent hydrocarbon group, X' is —CH$_2$—, —OCH$_2$—, —CH$_2$OCH$_2$— or —CO—NR$^2$—Y'—, wherein Y' is —CH$_2$— or an an o- m- or p-dimethylsilylphenylene group of the structural formula (Z'):

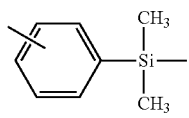

(Z')

and R$^2$ is as defined for R$^1$,

"a" is independently 0 or 1, and

Rf$^1$ is a divalent perfluoropolyether group of the general formula (i) or (ii):

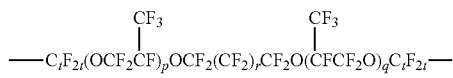

(i)

wherein p and q each are an integer from 1 to 150, the sum p+q is from 2 to 200 on average, r is an integer from 0 to 6, and t is 2 or 3,

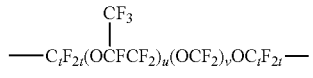

(ii)

wherein u is an integer from 1 to 200, v is an integer from 1 to 50 and t is as defined above.

3. The adhesive composition of claim 1, wherein the fluorinated organohydrogensiloxane (B) contains at least one monovalent perfluoroalkyl, monovalent perfluorooxyalkyl, divalent perfluoroalkylene or divalent perfluorooxyalkylene group per molecule.

4. The adhesive composition of claim 1, wherein the organosiloxane (F) has at least one monovalent perfluoroalkyl or monovalent perfluorooxyalkyl group which is bonded to a silicon atom through a divalent linking group containing a carbon atom or carbon and oxygen atoms.

* * * * *